United States Patent
Schroeder et al.

(10) Patent No.: US 11,116,294 B2
(45) Date of Patent: Sep. 14, 2021

(54) WALKING DEVICE WITH PICK UP MECHANISM

(71) Applicants: Gary L. Schroeder, Davis, CA (US);
Frank Sivo, Boca Raton, FL (US);
Wang Su, Livingston, NJ (US)

(72) Inventors: Gary L. Schroeder, Davis, CA (US);
Frank Sivo, Boca Raton, FL (US);
Wang Su, Livingston, NJ (US)

(73) Assignees: Gary L. Schroeder, Davis, CA (US);
Frank Sivo, Boca Raton, FL (US);
Wang Su, Livingston, NJ (US)

( * ) Notice: Subject to any disclaimer, the term of this patent is extended or adjusted under 35 U.S.C. 154(b) by 191 days.

(21) Appl. No.: 16/538,750

(22) Filed: Aug. 12, 2019

(65) Prior Publication Data
US 2021/0045508 A1  Feb. 18, 2021

(51) Int. Cl.
*A45B 3/00* (2006.01)
*G05B 15/02* (2006.01)
*A45B 9/00* (2006.01)

(52) U.S. Cl.
CPC ............... *A45B 3/00* (2013.01); *G05B 15/02* (2013.01); *A45B 2009/002* (2013.01)

(58) Field of Classification Search
CPC ............................ A45B 3/00; A45B 2009/002
See application file for complete search history.

(56) References Cited

U.S. PATENT DOCUMENTS

| | | |
|---|---|---|
| 1,270,973 A | 7/1918 | Rosenwasser |
| 3,029,828 A | 4/1962 | Kravitt |
| 3,158,851 A | 11/1964 | Ruthven |
| 4,071,152 A | 1/1978 | Kinkead et al. |
| 4,091,828 A | 5/1978 | Jorgensen |
| 4,121,605 A | 10/1978 | Schmerl |

(Continued)

FOREIGN PATENT DOCUMENTS

| | | |
|---|---|---|
| DE | 609945 C | 2/1935 |
| FR | 1016156 A | 11/1952 |

(Continued)

OTHER PUBLICATIONS

"Intelligent walking stick", authored by IBM Corporation, published by IP.com, dated Aug. 29, 2006, 2 pages.

(Continued)

*Primary Examiner* — David R Dunn
*Assistant Examiner* — Danielle Jackson
(74) *Attorney, Agent, or Firm* — Metis IP LLC (57) ABSTRACT

An improved walking device is disclosed wherein the walking device comprises an elongated body that is more than one foot in length, a movable arm coupled to the elongated body, a power source connector, a sensor, two rotation wheels, and two release and lock mechanisms, wherein the sensor is capable of detecting an orientation of the walking device and producing an electronic signal based on the orientation, wherein the electronic signal is capable of at least partially causing a rotational movement of the movable arm by releasing at least one of the two release and lock mechanisms, wherein the two release and lock mechanisms engage the two rotation wheels separately, and wherein the two rotation wheels are capable of driving the movable arm in two different directions.

18 Claims, 6 Drawing Sheets

(56) References Cited

U.S. PATENT DOCUMENTS

| | | | |
|---|---|---|---|
| 4,184,380 A | 1/1980 | Rivin | |
| 4,237,915 A | 12/1980 | Zabielski et al. | |
| 4,358,138 A | 11/1982 | Laughlin | |
| 4,811,750 A | 3/1989 | McAllister | |
| 4,884,730 A | 12/1989 | Carpenter | |
| RE33,675 E | 8/1991 | Young | |
| 5,176,160 A | 1/1993 | Osborn | |
| 5,259,236 A | 11/1993 | English | |
| 5,331,990 A | 7/1994 | Hall et al. | |
| 5,433,234 A | 7/1995 | Lapere | |
| 5,477,211 A | 12/1995 | Reynolds | |
| 5,554,975 A | 9/1996 | Hall et al. | |
| 5,755,245 A | 5/1998 | Van Helvoort | |
| 5,794,639 A | 8/1998 | Einbinder | |
| 5,826,605 A | 10/1998 | Hilton | |
| 5,853,219 A | 12/1998 | Santuccio | |
| 5,862,824 A | 1/1999 | Herman | |
| 6,039,064 A | 3/2000 | Hilton | |
| 6,055,997 A * | 5/2000 | Greenstadt | A61H 3/00 135/65 |
| 6,068,007 A | 5/2000 | Hilton | |
| 6,163,249 A | 12/2000 | Betcher, III | |
| 6,330,888 B1 | 12/2001 | Aravantinos et al. | |
| 6,392,556 B2 | 5/2002 | Tomich | |
| 6,666,796 B1 | 12/2003 | MacCready, Jr. | |
| 6,745,786 B1 | 6/2004 | Davis | |
| 7,398,791 B2 | 7/2008 | Tucker | |
| 7,637,273 B1 | 12/2009 | Lisenby | |
| 8,387,638 B2 | 3/2013 | Schroeder et al. | |
| 8,490,637 B2 | 7/2013 | Schroeder et al. | |
| 8,689,811 B2 | 8/2014 | Schroeder et al. | |
| 2004/0144410 A1 | 7/2004 | Cheng | |
| 2006/0129308 A1 | 6/2006 | Kates | |
| 2006/0206167 A1 | 9/2006 | Flaherty et al. | |
| 2008/0072942 A1 | 3/2008 | Warren | |
| 2009/0038664 A1 | 2/2009 | Juslin et al. | |
| 2012/0215355 A1 | 8/2012 | Bewley et al. | |
| 2020/0197254 A1 * | 6/2020 | Dehler | A45B 3/00 |

FOREIGN PATENT DOCUMENTS

| | | |
|---|---|---|
| GB | 868541 A | 5/1961 |
| KR | 101711300 B1 | 2/2017 |
| WO | 2018215819 A1 | 11/2018 |

OTHER PUBLICATIONS

International Search Report in PCT/US2020/45858 dated Dec. 7, 2020, 2 pages.
Written Opinion in PCT/US2020/45858 dated Dec. 7, 2020, 4 pages.

* cited by examiner

FIG. 6

WALKING DEVICE WITH PICK UP MECHANISM

FIELD OF INVENTION

The present invention is generally related to an improved walking device, such as a walking cane or a crutch, with a pick up mechanism that enables the device to be easily picked up when dropped on the ground.

BACKGROUND OF THE INVENTION

Presently, many people use devices such as walking canes or crutches to facilitate their movement. Walking canes and crutches can fall to ground or be dropped by the user, or can fall from any given place of rest. Once they fall on the ground, it could be very challenging for the user to pick them up, because this requires the user to bend over to reach the ground. Normally, those who require a walking cane or a crutch to move around are those with compromised or impaired physical conditions. Bending over to reach the ground could be very difficult for them, if not impossible.

There have been some attempts to solve this problem. For example, U.S. Pat. Nos. 5,826,605, 6,039,064, and 6,068,007 disclosed a design which uses a series of complicated mechanicals to raise an arm when a cane or crutch falls on the ground. The draw back of this design is that it is too complicated, involves too many mechanical parts, and may not be very reliable. Another attempt to solve this problem is described in the paper "Intelligent walking stick". This paper disclosed a walking stick with three prongs that can open up similar to the spokes on an umbrella. The opening up mechanism is based on voice command. When the user speaks a phrase which matches a prerecorded voice signature, the three prongs are opened, resulting in two prongs touching the ground and raising the cane, and the third prong sticking in the air for the user to pick up. This design requires sophisticated voice recognition, which may not work very well in a noisy environment, such as in the streets or in a shopping plaza. Moreover, this design requires three prongs to be installed on a walking device, which complicates the design of the walking device. Yet another attempt to solve the problem is described in U.S. Pat. Nos. 8,387,638, 8,490,637, and 8,689,811. These patents described a number of design alternatives that are improvements over the previous designs. However, these design alternatives are relatively difficult to manufacture for mass market.

Therefore, there is a need for an improved device to facilitate the convenient retrieval of a walking cane or a crutch that is dropped or falls on the ground.

DETAILED DESCRIPTION OF POSSIBLE EMBODIMENTS OF THE INVENTION

Possible embodiments of the invention are discussed in this section.

According to one embodiment of the present invention, an improved walking device is presented. This walking device could be a walking cane, a crutch, or any other devices that assist in walking. A walking device usually has an elongated body that is more than one foot in length. A sensor is incorporated into the walking device. The sensor senses an orientation of the walking device. The orientation sensor could be an accelerometer or a rate sensor such as a gyroscope. A power source is also incorporated into the walking device which supplies power to the sensor. The power source is connected to a power source connector. At least one movable arm is attached to the walking device. The movable arm can rotate on the walking device. When the improved walking device according to one embodiment of the present invention falls onto the ground, the orientation sensor such as an accelerometer senses an orientation of the elongated body of the walking device, for example horizontal to the ground or vertical to the ground. If the sensed orientation is approximately horizontal to the ground within a range, it suggests that the walking device is likely dropped, then the sensor would produce electronic signal(s) to cause the movable arm to rise up. Once the movable arm raises up, the walking device's user can grab it without having to bend too much, thus making it fairly easy for the walking device to be picked up.

According to another embodiment of the present invention, once the walking device is on the ground, the orientation sensor can sense whether the walking device is lying on its right side or left side. The orientation sensor will produce electronic signal(s) accordingly which will cause a motor to rotate in the correction direction. The motor drives an actuator cam through a gear arrangement. The actuator cam may have a cam shaft with cam trip cogs attached to it. Through rotation the actuator cam can release locking levers that hold rotation wheels in place. Which locking lever is released may depend on which direction the actuator cam rotates. Once a locking lever is released, the corresponding rotation wheel will rotate driven by mechanism such as a torsion spring. The rotation wheel may be attached to a shaft which may be attached to a wand hub and a wand. When the rotation wheel rotates, it drives the wand to rotate approximately 90 degrees. The wand is typically parallel with the body of the walking device. When the walking devices lies on the ground, the wand would be approximately parallel with the ground. Once it rotates about 90 degrees, the far end of the wand would be a couple of feet above the ground, depending on the length of the wand. It would be fairly easy to pick up the walking device by picking up the wand.

Figure 1:
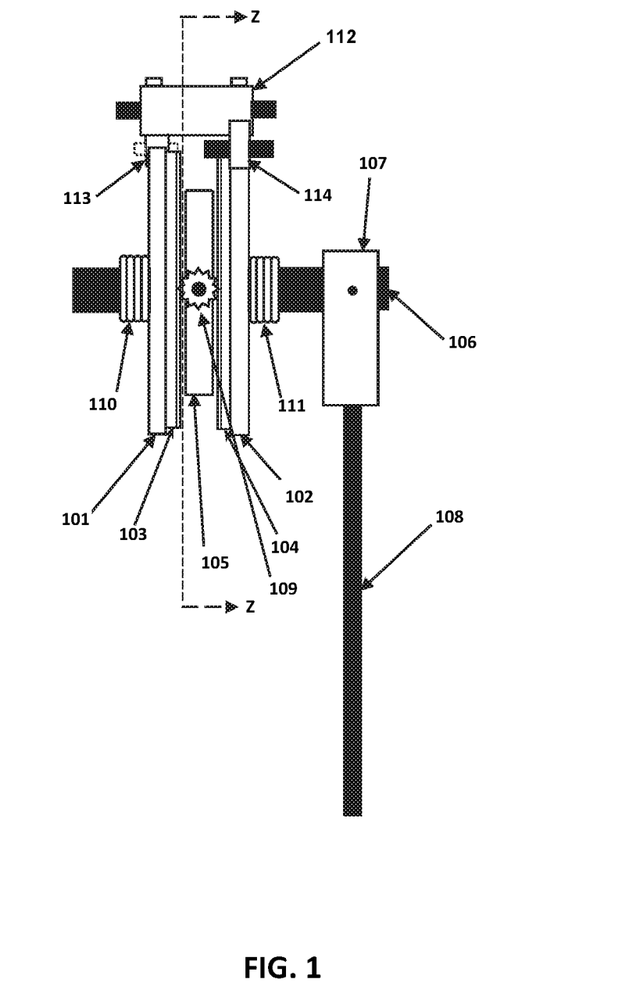
FIG. 1 is a side view of the drive assembly of one embodiment of the invention.

FIG. 1 is a side view of the drive assembly of one embodiment of the invention. According to this embodiment, there are two rotation wheels 101 and 102. Two flat ring gears 103 and 104 are each affixed to the inward side of each rotation wheel 101 and 102. A shaft wheel 105 is attached to an output shaft 106. The shaft wheel 105 is located in between flat ring gears 103 and 104. Also attached to the extended portion of the output shaft 106 is a wand hub 107. A wand 108 is attached to the output shaft 106 through the wand hub 107. Attached to the shaft wheel 105 are two small pinion gears. One of the two small pinion gears, pinion gear 109, is shown here. The other pinion gear is on the opposite side of pinion gear 109. The two pinion gears engage the two flat ring gears 103 and 104. The two flat ring gears 103 and 104 are each fixed to the two rotation wheels 101 and 102. The two rotation wheels 101 and 102 are free to rotate on the output shaft 106.

According to another embodiment of the invention, a rotational force is applied to each of the two rotation wheels 101 and 102 by torsion springs 110 and 111, so that when looking at them from the angle where the output shaft 106 is pointing at you, one rotation wheel will rotate clockwise and the other rotation wheel will rotate counter clockwise. With one of the two rotation wheels 101 and 102 held still and the other allowed to rotate approximately 180 degrees, the differential function between the flat ring gears 103 and 104 and the two small pinion gears, one of which is shown here as pinion gear 109, can cause the shaft wheel 105 to rotate approximately 90 degrees. Because the shaft wheel 105 is attached to the output shaft 106, when the shaft wheel 105 rotates approximately 90 degrees the output shaft 106 will also rotate approximately 90 degrees, which will in turn rotate the wand 108 approximately 90 degrees into a deployed position.

According to another embodiment of the invention, above the two rotation wheels 101 and 102 are two locking levers 113 and 114, and an actuator cam 112. When the actuator cam 112 rotates, it can release one of the two locking levers 113 or 114, depending on the actuator cam 112's direction of rotation. The two rotation wheels 101 and 102 are held in place by the two locking levers 113 and 114 correspondingly, as shown in FIG. 1. Once one of the two locking levers 113 and 114 is released by the actuator cam 112, the corresponding rotation wheel 101 or 102 will rotate driven by the force of the torsion spring 110 or 111, thus driving wand 108 to rotate through the small pinion gears, the shaft wheel 105 and the output shaft 106.

Rotation wheels 101 and 102 rotate in opposite directions, therefore they drive output shaft 106 and wand 108 in opposite directions. They are held in place by two locking levers 113 and 114. The assembly controls which locking lever is released by determining which direction to rotate the actuator cam 112. Rotating the actuator cam 112 in one direction will release a first locking lever and leave a second locking lever in locked position. Rotating the actuator cam in an opposition direction will release the second locking lever and will keep the first locking lever in locked position. Which locking lever is released determines which rotation wheel is released to rotate, and in turn determines which direction the wand 108 will rotate because wand 108 is driven by the released rotation wheel. Through this design, the assembly can control which direction wand 108 rotates.

Figure 2:
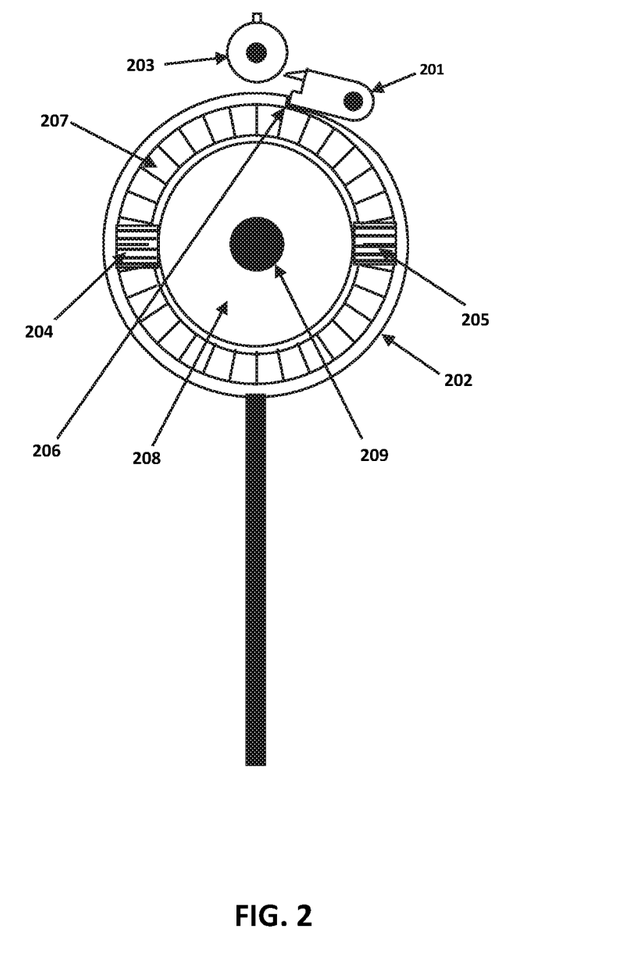
FIG. 2 is another side view of the drive assembly of one embodiment of the invention.

FIG. 2 is another side view of the drive assembly of one embodiment of the invention. According to this embodiment, rotation wheel 202 has a stepped section 206 in its perimeter. A locking lever 201 locks rotation wheel 202 in place by engaging the stepped section 206. An actuator cam 203 is installed next to the locking lever 201, which allows the actuator cam 203 to release the locking lever 201 from its position that engages the stepped section 206. Once the locking lever 201 is released from the stepped section 206, the rotation wheel 202 can rotate driven by a torsion force such as a torsion spring. Flat ring gear 207 is attached to the rotation wheel 202 and will rotate together with rotation wheel 202. Flat ring gear 207 also engages small pinion gears 204 and 205. The small pinion gears 204 and 205 are installed on shaft wheel 208, and the shaft wheel 208 is attached to output shaft 209. When rotation wheel 202 rotates, the flat ring gear 207 rotates with it and drives the output shaft 209 through the pinion gears 204 and 205, and the shaft wheel 208. The differential function helps reduce the force needed to rotate the rotation wheel.

Figure 3:
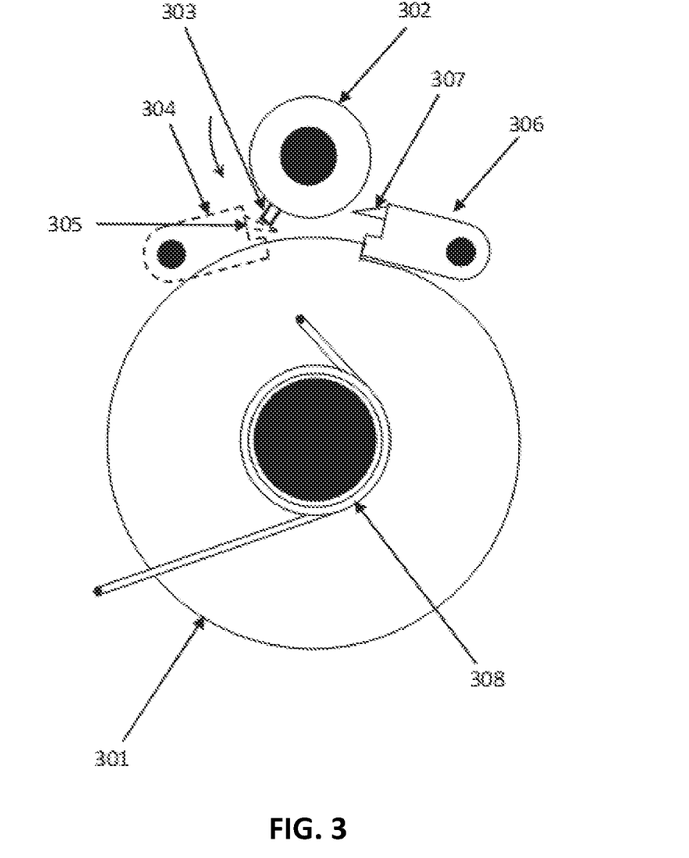
FIG. 3 is a side view of the release mechanism of one embodiment of the invention.

FIG. 3 is a side view of the release mechanism of one embodiment of the invention. According to this embodiment, the rotation wheel 301 is locked in place by locking lever 306 which prevents torsion spring 308 from rotating rotation wheel 301. Locking lever 306 has on it a catch claw 307. Catch claw 307 is movably attached to locking lever 306. Catch claw 307 can be connected to locking lever 306 by a spring, so that it can be depressed in one direction (for example downwards in the figure) without moving the locking lever 306, and return back to its original position by the biasing force of the spring. A structure, preferably a mechanical structure, on the locking lever 306 can act as a stop to prevent catch claw 307 from moving relative to the locking lever 306 beyond a certain position, for example upwards in the figure beyond its current position. Another locking lever 304 holds another rotation wheel. There is a catch claw 305 on locking lever 304. Locking lever 304 and catch claw 305 can be similarly structured as locking lever 306 and catch claw 307. An actuator cam 302 has on it a cam trip cog 303. The cam trip cog 303 is a structure that extends from the actuator cam 302 and can act as a trigger. When the actuator cam 302 rotates, cam trip cog 303 can pass through catch claw 305 by depressing it, without moving locking lever 304. If the actuator cam 302 rotates in an opposite direction, cam trip cog 303 can push catch claw 305 in an opposite direction. Since catch claw 305 is prevented from moving in the opposition direction relative to locking lever 304 by a stop structure on locking lever 304, the trip cog 303 will push up locking lever 304 and release the rotation wheel it is holding.

Figure 4:
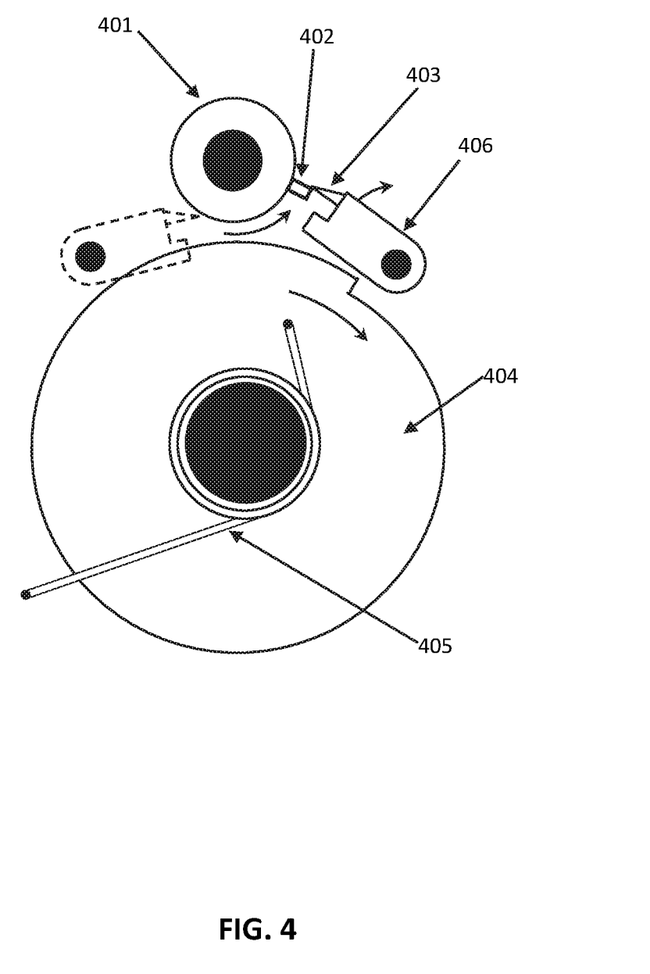
FIG. 4 is another side view of the release mechanism of one embodiment of the invention.

FIG. 4 is another side view of the release mechanism of one embodiment of the invention. According to this embodiment, actuator cam 401 rotates and cam trip cog 402 touches catch claw 403. Catch claw 403 is stopped by a stop on locking lever 406 so that it cannot move relative to locking lever 406 in the direction that trip cog 402 is pushing it. Because catch claw 403 cannot move relative to locking lever 406 in the direction that trip cog 402 is pushing it, it moves locking lever 406 by for example rotating it upwards. Once locking lever 406 is moved away from the locking position, rotation wheel 404 will rotate under the force of torsion spring 405. If the actuator cam 401 moves in the opposition direction, cam trip cog 402 can pass through catch claw 403 by depressing it downwards without moving locking lever 406, and rotation wheel 404 will remain in a locked position.

Figure 5:
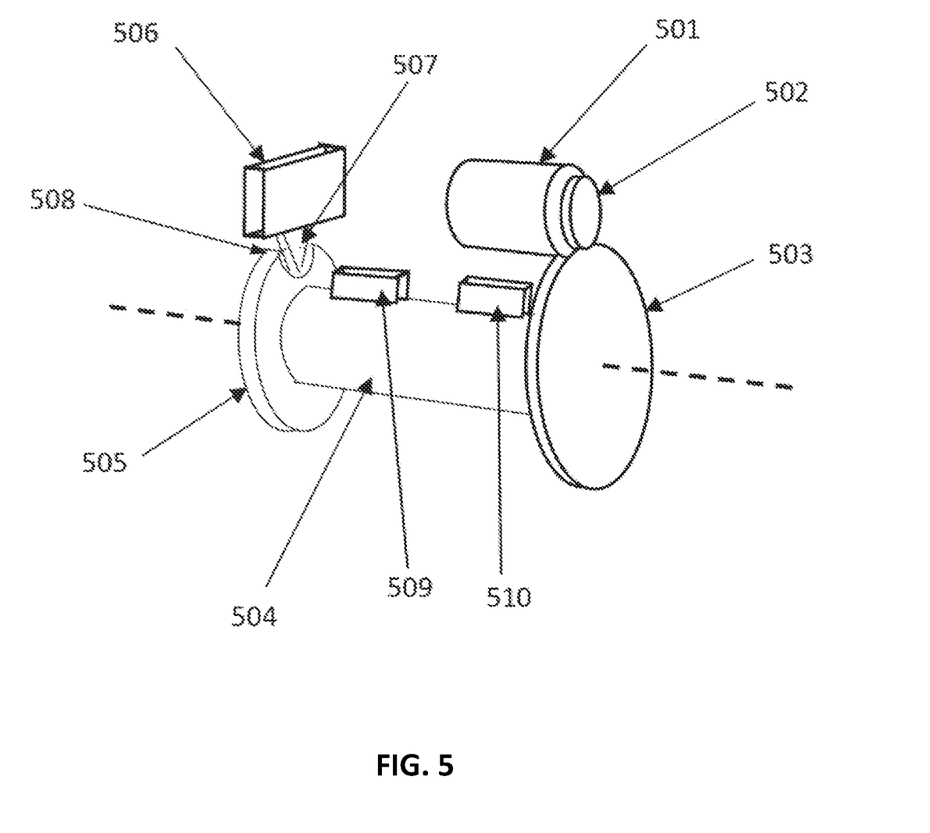
FIG. 5 is a perspective view showing the actuator cam drive assembly of one embodiment of the invention.

FIG. 5 is a perspective view showing the actuator cam drive assembly of one embodiment of the invention. According to this embodiment, actuator cam 504 has a gear wheel 503 attached to it. An indexing wheel 505 is also attached to the actuator cam 504. Cam trip cogs 509 and 510 are also attached to actuator cam 504. A gear motor 501 has a drive gear 502. Drive gear 502 engages gear wheel 503. Sensor switch 506 has a toggle arm 507. Sensor switch 506 is mounted to a control board in such a way that the toggle arm 507 of the switch is activated by a notch 508 on indexing wheel 505. There is a microcontroller which can determine if a walking device has dropped to a horizontal position or not through reading signals from an orientation sensor. The orientation sensor can also tell the microcontroller whether the walking device is lying on its left side or right side. Once the microcontroller receives signal that the walking device is lying on the ground, it will activate gear motor 501 to rotate drive gear 502. Depending on which side the walking device is lying on, the gear motor 501 will rotate in different directions. Gear motor 501 drives drive gear 502 which in turn drives gear wheel 503. When gear wheel 503 rotates, actuator cam 504 also rotates, and cam trip cogs 509 and 510 rotate with the actuator cam 504. When actuator cam 504 makes a full revolution, notch 508 on indexing wheel 505 also makes a full revolution. Toggle arm 507 on sensor switch 506 senses that notch 508 has made a full revolution, the sensor switch 506 will signal to microcontroller to stop gear motor 501 from rotating. During the revolution, cam trip cog passes one catch claw by depressing it downwards without moving the corresponding locking lever, leaving the corresponding rotation wheel in locked position. Cam trip cog pushes another catch claw and lift the corresponding locking lever upwards and releases the corresponding rotation wheel, thus moving a wand in the desired direction. Cam trip cogs 509 and 510 can have different structures and can be connected into one long trip cog.

Figure 6:
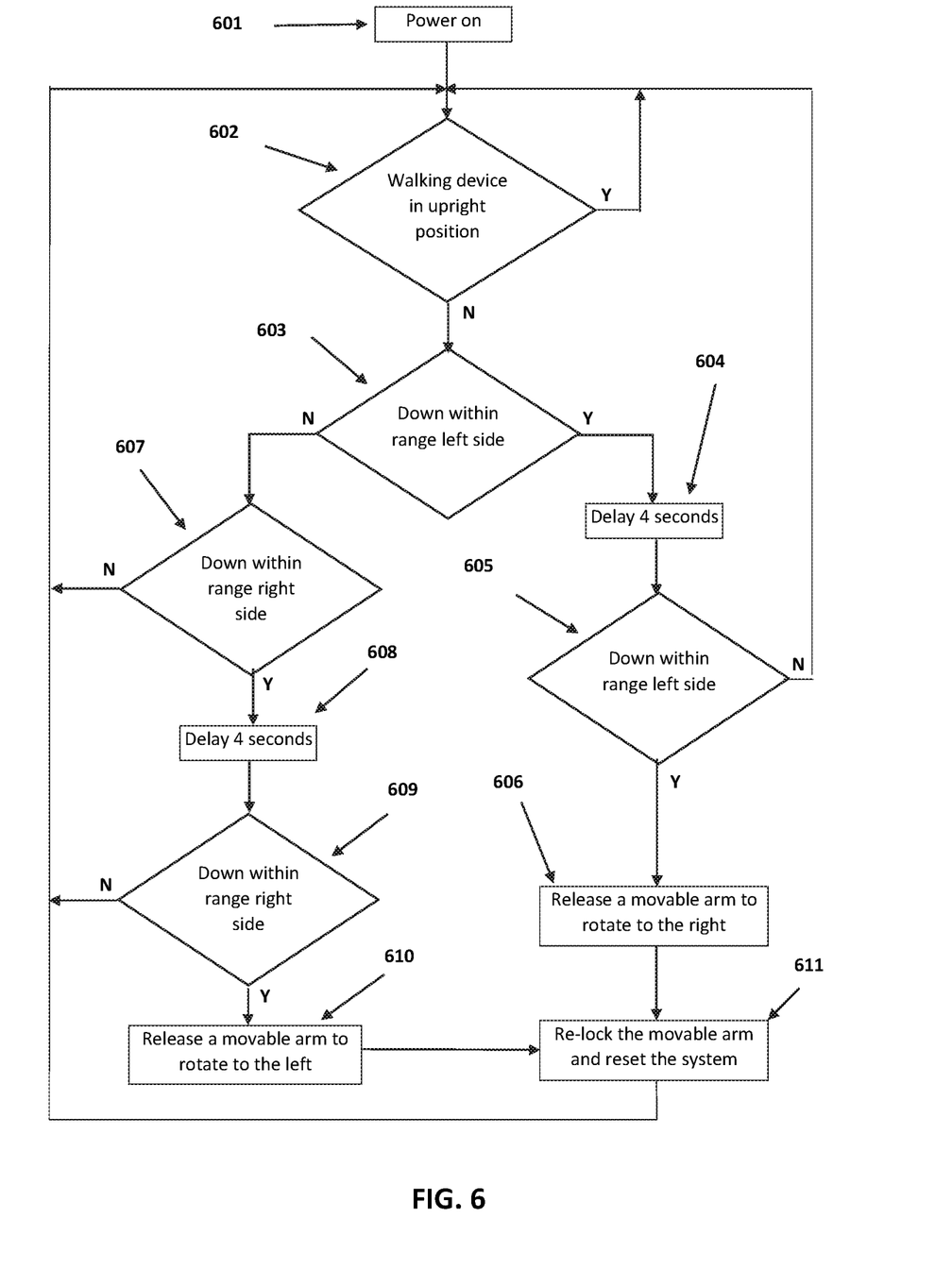
FIG. 6 is a flow chart showing illustrative steps that may be followed to perform the improved walking device functions in accordance with one embodiment of the invention.

FIG. 6 is a flow chart showing illustrative steps that may be followed to perform the improved walking device functions in accordance with one embodiment of the invention. According to this embodiment, the user turns on a power source at step 601. The power source supplies power to a driving system through the power source connector. The system includes a microcontroller or microprocessor, an orientation sensor that senses the orientation of a walking device, a memory that stores a software program executable by the microprocessor, and a motor. At step 602, the orientation sensor sends electronic signals to the microprocessor which indicate whether the walking device is in an upright position or not. Microprocessor receives these electronic signals and decides next steps. If the walking device is in an upright position, then the process loops back. If the walking device is not in an upright position, at steps 603 and 607, the orientation sensor would produce signals for the system to determine if the walking device is relatively parallel to the ground within a certain range, for example within 30 degrees from a horizontal position. The range can be more or less than 30 degrees, it can be set with the software program. To set a range is to account for the situation where the ground may not be level, or the walking device may be resting on an object on the ground, such as a stone or a box. The orientation sensor would also produce signals for the system to determine if the walking device is lying on its left side or right side. If the walking device is not relatively parallel the ground within a certain range, then the process loops back to step 602.

If the walking device is down within a certain range, then depending on whether it is lying on its left side or right side, the process progresses to steps 604 and 605, or steps 608 and 609 respectively, where the systems delays a little bit, could be a few seconds such as 4 seconds, and then try to make the same determination as in steps 603 and 607. The purpose of these repeated determinations after a short delay is to make sure that the walking device is settled in its position. In some cases the walking device after falling on the ground could bounce around and flip from left to right. The delay can be achieved by a timer which is a software program setting up counting registers within a microprocessor to count internal master clock pulses until a required count total is reached. The timer can be achieved by other methods as well. If, after steps 604 and 605, or steps 608 and 609, the system determines that the walking device is down within certain range lying on its left or right side, then at steps 606 or 610, respectively, the system will release the rotation wheel to drive a movable arm to rotate to the correct direction. If the walking device is lying on its left side, the movable arm will rotate to its right side. If the walking device is lying on its right side, the movable arm will rotate to its left side. Once the walking device is picked up by the user, then at step 611 the user re-locks the movable arm by pushing it back to its locked position and the system resets. The process then loops back to step 602. The above mentioned steps represent just one embodiment of the present invention. Different steps or different orders of the steps can be performed to achieve similar results.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve similar results. All the variations in the design components or orders of the method steps are considered as part of this invention as long as they achieve substantially the same results.

The invention is further defined and claimed by the following claims.

We claim:

1. A device comprising:
   an elongated body;
   a movable arm coupled to the elongated body;
   a power source connector;
   a sensor;
   two rotation wheels;
   two release and lock mechanisms;
   wherein the sensor is capable of detecting an orientation of the device and producing an electronic signal based on the orientation, wherein the electronic signal is capable of at least partially causing a rotational movement of the movable arm by releasing at least one of the two release and lock mechanisms, wherein the two release and lock mechanisms engage the two rotation wheels separately, and wherein the two rotation wheels are capable of driving the movable arm in different directions.

2. The device of claim 1 further comprising an actuator cam system, wherein the actuator cam system engages at least one of the two release and lock mechanisms.

3. The device of claim 2 wherein the actuator cam system comprises at least one cam trip cog, wherein the cam trip cog is capable of releasing at least one of the two release and lock mechanisms.

4. The device of claim 2 further comprising a cam drive system, wherein the cam drive system comprises a motor and a gear, wherein the motor drives the gear and the gear engages the actuator cam system.

5. The device of claim 4 wherein the cam drive system comprises a sensor switch to sense the rotational position of the actuator cam system.

6. The device of claim 1 wherein at least one of the two release and lock mechanisms comprises a catch claw.

7. The device of claim 6 wherein the catch claw is capable of moving in one direction without releasing the release and lock mechanism.

8. The device of claim 6 wherein the release and lock mechanism comprises a stop structure and wherein the catch claw is prevented from moving beyond a certain position by the stop structure.

9. The device of claim 1 further comprising a spring mechanism, wherein the spring mechanism engages at least one of the two rotation wheels.

10. A module for attaching to a device comprising:
    a movable arm;

a power source connector;
a sensor;
two rotation wheels;
two release and lock mechanisms;
wherein the sensor is capable of detecting an orientation of the device and producing an electronic signal based on the orientation, wherein the electronic signal is capable of at least partially causing a rotational movement of the movable arm by releasing at least one of the two release and lock mechanisms, wherein the two release and lock mechanisms engage the two rotation wheels separately, and wherein the two rotation wheels are capable of driving the movable arm in different directions.

11. The module of claim 10 further comprising an actuator cam system, wherein the actuator cam system engages at least one of the two release and lock mechanisms.

12. The module of claim 11 wherein the actuator cam system comprises at least one cam trip cog, wherein the cam trip cog is capable of releasing at least one of the two release and lock mechanisms.

13. The module of claim 11 further comprising a cam drive system, wherein the cam drive system comprises a motor and a gear, wherein the motor drives the gear and the gear engages the actuator cam system.

14. The module of claim 13 wherein the cam drive system comprises a sensor switch to sense the rotational position of the actuator cam system.

15. The module of claim 10 wherein at least one of the two release and lock mechanisms comprises a catch claw.

16. The module of claim 15 wherein the catch claw is capable of moving in one direction without releasing the release and lock mechanism.

17. The module of claim 15 wherein the release and lock mechanism comprises a stop structure and wherein the catch claw is prevented from moving beyond a certain position by the stop structure.

18. The module of claim 10 further comprising a spring mechanism, wherein the spring mechanism engages at least one of the two rotation wheels.

* * * * *